United States Patent
Kato et al.

(10) Patent No.: US 10,490,352 B2
(45) Date of Patent: Nov. 26, 2019

(54) MULTI-LAYER CERAMIC CAPACITOR AND METHOD OF PRODUCING THE SAME

(71) Applicant: TAIYO YUDEN CO., LTD., Tokyo (JP)

(72) Inventors: Yoichi Kato, Tokyo (JP); Kotaro Mizuno, Tokyo (JP); Yukihiro Konishi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/107,608

(22) Filed: Aug. 21, 2018

(65) Prior Publication Data

US 2019/0006105 A1    Jan. 3, 2019

Related U.S. Application Data

(63) Continuation of application No. 15/380,346, filed on Dec. 15, 2016, now Pat. No. 10,083,796.

(30) Foreign Application Priority Data

Dec. 15, 2015 (JP) .................................. 2015-243881

(51) Int. Cl.
*H01G 4/30* (2006.01)
*H01G 4/005* (2006.01)
(Continued)

(52) U.S. Cl.
CPC .............. *H01G 4/30* (2013.01); *H01G 4/005* (2013.01); *H01G 4/1227* (2013.01);
(Continued)

(58) Field of Classification Search
None
See application file for complete search history.

(56) References Cited

U.S. PATENT DOCUMENTS

2001/0016252 A1* 8/2001 Nagamoto ............... H01B 1/16
428/209
2013/0100579 A1    4/2013 Morito
(Continued)

FOREIGN PATENT DOCUMENTS

CN     104103419 A    10/2014
CN     105097282 A    11/2015
(Continued)

OTHER PUBLICATIONS

Office Action dated Feb. 20, 2018 in Japanese Application No. 2015-243881, along with its English translation.
(Continued)

*Primary Examiner* — Dion Ferguson
(74) *Attorney, Agent, or Firm* — Saliwanchik, Lloyd & Eisenschenk

(57) ABSTRACT

A multi-layer ceramic capacitor includes a multi-layer unit, side margins, and bonding units. The multi-layer unit includes ceramic layers laminated in a first direction and internal electrodes disposed between the ceramic layers. The side margins cover the multi-layer unit from a second direction orthogonal to the first direction. The bonding units are each disposed between the multi-layer unit and each of the side margins and have higher silicon content than the ceramic layers and the side margins.

5 Claims, 8 Drawing Sheets

(51) Int. Cl.
*H01G 4/12* (2006.01)
*H01G 4/232* (2006.01)

(52) U.S. Cl.
CPC .......... *H01G 4/232* (2013.01); *H01G 4/2325* (2013.01); *H01G 4/12* (2013.01)

(56) References Cited

U.S. PATENT DOCUMENTS

| | | |
|---|---|---|
| 2014/0301012 A1 | 10/2014 | Kim |
| 2014/0301015 A1 | 10/2014 | Kim |
| 2015/0340155 A1 | 11/2015 | Fukunaga et al. |
| 2016/0293332 A1 | 10/2016 | Kato et al. |
| 2016/0351335 A1 | 12/2016 | Kato et al. |
| 2017/0133157 A1 | 5/2017 | Fukunaga et al. |
| 2017/0243697 A1 | 8/2017 | Mizuno et al. |

FOREIGN PATENT DOCUMENTS

| | | |
|---|---|---|
| JP | 08-306576 A | 11/1996 |
| JP | 2001-297946 A | 10/2001 |
| JP | 2006-041268 A | 2/2006 |
| JP | 2012-209539 A | 10/2012 |
| JP | 2012-227198 A | 11/2012 |
| JP | 2014-204116 A | 10/2014 |
| JP | 2015-065222 A | 4/2015 |
| JP | 2015-070218 A | 4/2015 |
| JP | 2016-001721 A | 1/2016 |
| KR | 10-2014-0121726 A | 10/2014 |

OTHER PUBLICATIONS

Office Action dated Jan. 8, 2018 in U.S. Appl. No. 15/380,346.
Office Action dated Nov. 9, 2018 in Chinese Application No. 201610980495.8, along with its English translation.
Office Action dated May 28, 2019 in Japanese Application No. 2018-188863, along with its English translation.

* cited by examiner

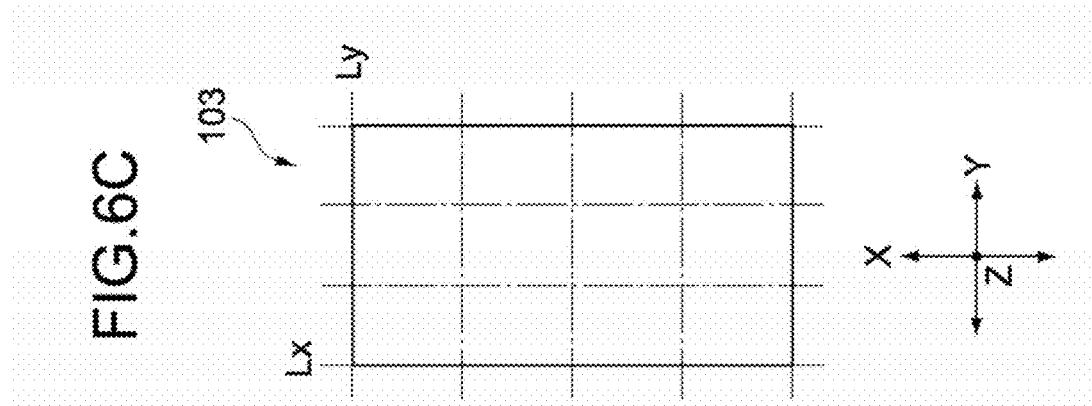
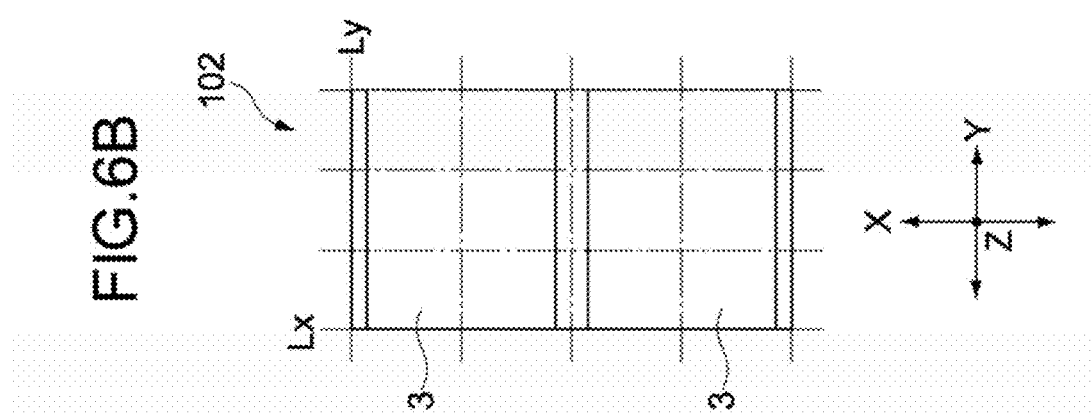
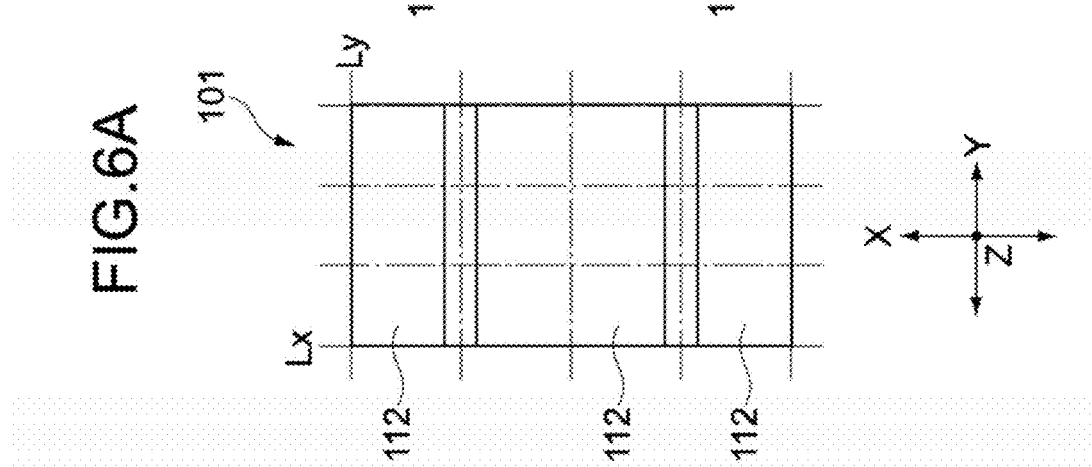

MULTI-LAYER CERAMIC CAPACITOR AND METHOD OF PRODUCING THE SAME

CROSS-REFERENCE TO RELATED APPLICATIONS

This application is a continuation of U.S. application Ser. No. 15/380,346, filed Dec. 15, 2016, which claims the benefit under 35 U.S.C. § 119 to Japanese Patent Application No. 2015-243881, filed Dec. 15, 2015, which is hereby incorporated by reference in its entirety.

BACKGROUND

The present invention relates to a multi-layer ceramic capacitor including side margins provided in a subsequent step, and to a method of producing the multi-layer ceramic capacitor.

Along with miniaturization and achievement of high performance of electronic devices, there have recently been increasingly strong demands for miniaturization and increase in capacity with respect to multi-layer ceramic capacitors used in the electronic devices. In order to meet those demands, it is effective to enlarge internal electrodes of the multi-layer ceramic capacitor. In order to enlarge the internal electrodes, it is necessary to thin side margins for ensuring insulation properties of the periphery of the internal electrodes.

Meanwhile, in a general method of producing a multi-layer ceramic capacitor, it is difficult to form side margins having a uniform thickness because of precision in each step (e.g., patterning of internal electrodes, cutting of a multi-layer sheet, etc.). Thus, in such a method of producing a multi-layer ceramic capacitor, as the side margins are made thinner, it is more difficult to ensure insulation properties of the periphery of the internal electrodes. Japanese Patent Application Laid-open No. 2012-209539 discloses a technique of providing side margins in a subsequent step. In other words, this technique discloses that a multi-layer chip including internal electrodes exposed to side surfaces is produced, and side margins are then provided to the side surfaces of the multi-layer chip. This makes it possible to form side margins having a uniform thickness, and to ensure insulation properties of the periphery of the internal electrodes also when the side margins are made thinner.

BRIEF SUMMARY

The technique disclosed in Japanese Patent Application Laid-open No. 2012-209539 provides a multi-layer chip by pressure-bonding laminated ceramic layers to one another by hydrostatic pressing, uniaxial pressing, or the like. In the multi-layer chip, due to a pressing force applied to the side surfaces from which the internal electrodes are exposed, the ceramic layers are easily peeled off from one another. Thus, the side margins are attached to the side surfaces of the multi-layer chip such that a strong pressing force is not applied to the side surfaces.

As a result, before sintering, the side margins tend to have a lower density than the multi-layer chip. A difference in density between the multi-layer chip and the side margins causes a difference in shrinkage behavior at sintering between the multi-layer chip and the side margins. This may lead to occurrence of cracks and peel-off between the multi-layer chip and the side margins and also reduction in reliability, particularly, in durability in high-temperature and moisture-resistance tests.

In view of the circumstances as described above, it is desirable to provide a multi-layer ceramic capacitor and a method of producing the multi-layer ceramic capacitor that are capable of providing high bonding properties of side margins.

According to an embodiment of the present invention, there is provided a multi-layer ceramic capacitor including a multi-layer unit, side margins, and bonding units.

The multi-layer unit includes ceramic layers laminated in a first direction and internal electrodes disposed between the ceramic layers.

The side margins cover the multi-layer unit from a second direction orthogonal to the first direction.

The bonding units are each disposed between the multi-layer unit and each of the side margins and have higher silicon content than the ceramic layers and the side margins.

In this configuration, molten phases containing silicon are generated at the sintering in the bonding units having high silicon content, and thus the bonding units are softened. This causes the bonding units at the sintering to operate so as to reduce a difference in shrinkage behavior at the sintering between the multi-layer unit and the side margins. As a result, the multi-layer unit and the side margins are successfully bonded to each other via the bonding units.

Each of the bonding units may have a thickness of 0.5 µm or more and 5 µm or less.

With the bonding units of 0.5 µm or more, the multi-layer unit and the side margins are more successfully bonded to each other via the bonding units. When the thickness of the bonding units is suppressed to be 5 µm or less, influence of the bonding units on the form and performance of the multi-layer ceramic capacitor can remain small.

The bonding units may include glass phases unevenly distributed.

The molten phases generated in the bonding units at the sintering tend to be mutually aggregated. The aggregated molten phase are solidified, and then changed to glass phases. As a result, in the bonding units of the multi-layer ceramic capacitor, characteristic structures in which glass phases containing silicon are unevenly distributed are found.

The glass phases may contain at least one of barium, manganese, magnesium, boron, vanadium, holmium, aluminum, calcium, zinc, potassium, tin, and zirconium.

In this configuration, at least one of accessory components such as barium, manganese, magnesium, boron, vanadium, holmium, aluminum, calcium, zinc, potassium, tin, and zirconium is added to the glass phases containing silicon, and thus the melting point of the glass phases decreases. As a result, molten phase are easily generated in the bonding units at sintering.

The ceramic layers may be polycrystals having a Perovskite structure containing barium and titanium.

The glass phases may contain barium.

In this configuration, when the ceramic layers are formed of a barium titanate based material, a large capacitance is obtained, and when barium contained in the ceramic layers and the like is added to the glass phases of the bonding units, the melting point of the glass phases of the bonding units decreases.

According to another embodiment of the present invention, there is provided a method of producing a multi-layer ceramic capacitor, the method including: preparing an unsintered multi-layer chip that includes ceramic layers laminated in a first direction and internal electrodes disposed between the ceramic layers; producing a body by providing side margins to side surfaces of the multi-layer chip via bonding units, the side surfaces being oriented in a second direction orthogonal to the first direction, the bonding units having higher silicon content than the ceramic layers and the side margins; and sintering the body.

The sintering the body may include generating molten phases in the bonding units, the molten phases containing silicon.

It is possible to provide a multi-layer ceramic capacitor and a method of producing the multi-layer ceramic capacitor that are capable of providing high bonding properties of side margins.

These and other objects, features and advantages of the present invention will become more apparent in light of the following detailed description of embodiments thereof, as illustrated in the accompanying drawings.

BRIEF DESCRIPTION OF THE DRAWINGS

FIGS. 6A, 6B, and 6C are plan views showing a production process of the multi-layer ceramic capacitor;

DETAILED DESCRIPTION

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

Figure 1:
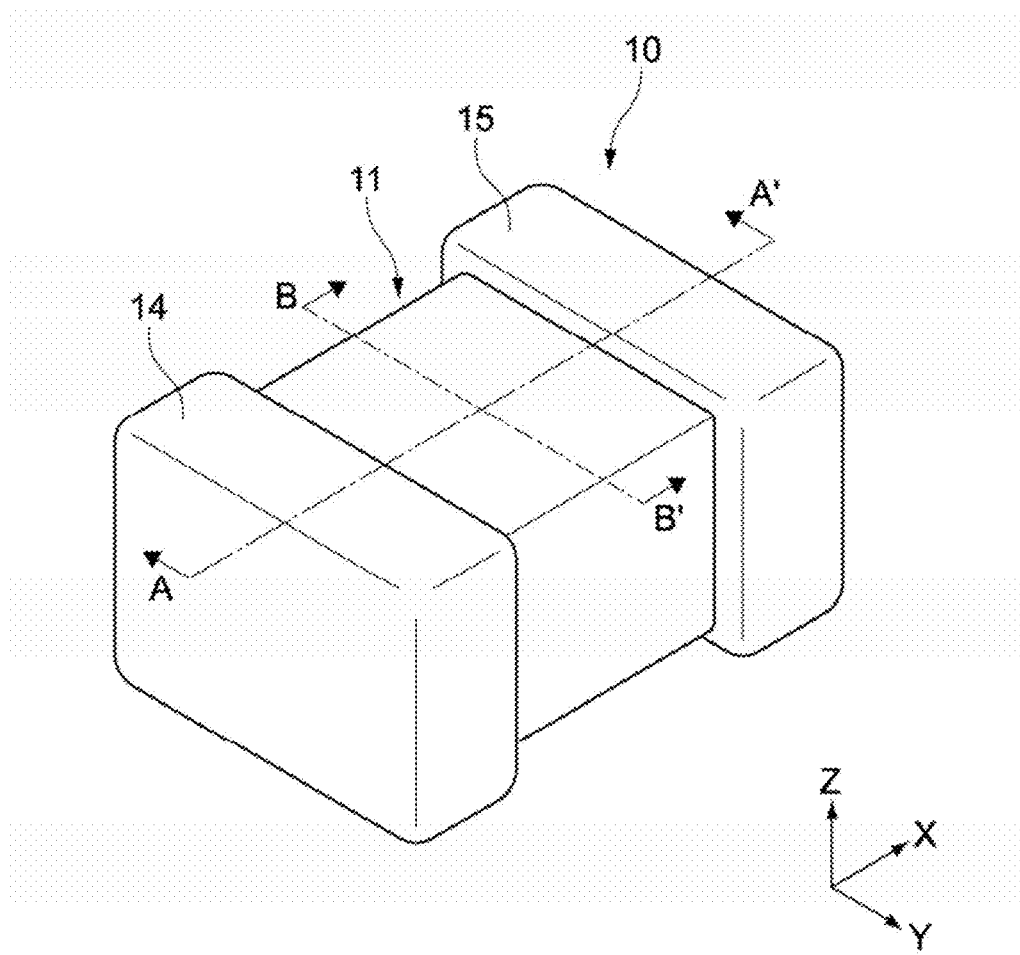
FIG. 1 is a perspective view of a multi-layer ceramic capacitor according to an embodiment of the present invention.
Figure 2:
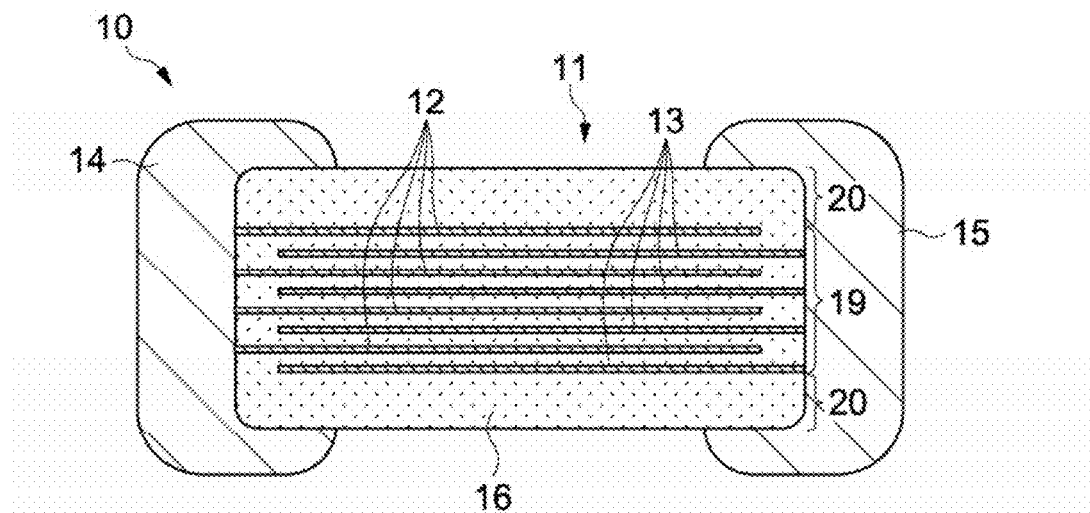
FIG. 2 is a cross-sectional view of the multi-layer ceramic capacitor taken along the A-A' line in FIG. 1.
Figure 3:
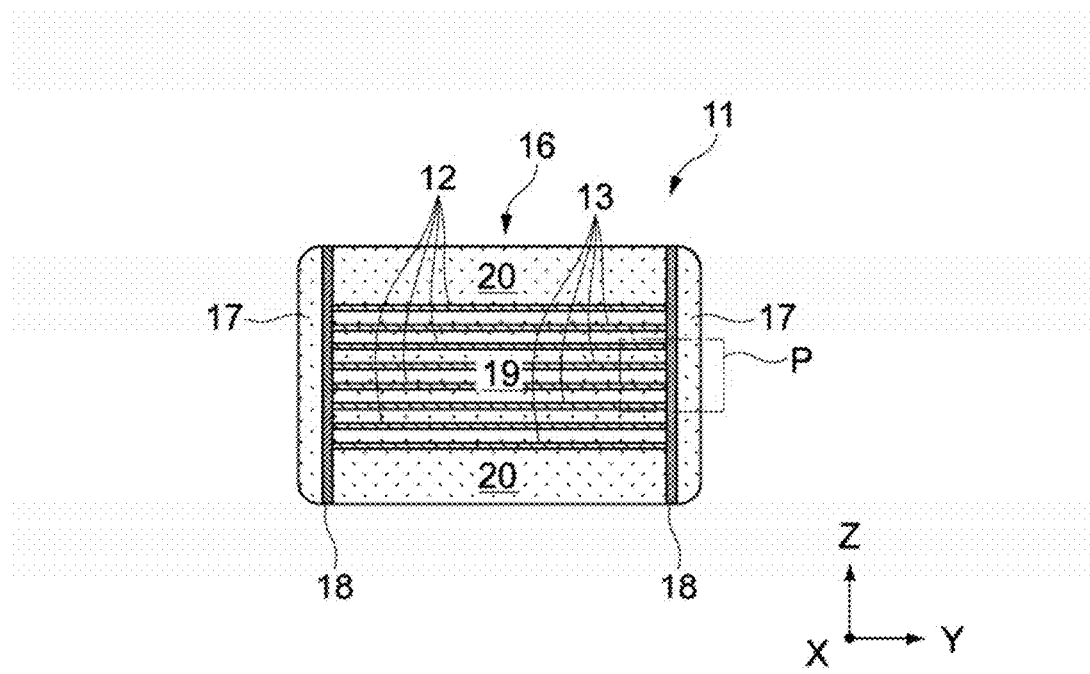
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a body 11, a first external electrode 14, and a second external electrode 15.

Typically, the body 11 has two side surfaces oriented in a Y-axis direction and two main surfaces oriented in a Z-axis direction. Ridges connecting the respective surfaces of the body 11 are chamfered. It should be noted that the form of the body 11 is not limited to the form as described above. For example, the surfaces of the body 11 may be curved surfaces, and the body 11 may be rounded as a whole.

The first external electrode 14 and the second external electrode 15 cover both end surfaces of the body 11 that are oriented in an X-axis direction, and extend to four surfaces that are connected to both the end surfaces oriented in the X-axis direction. With this configuration, both of the first external electrode 14 and the second external electrode 15 have U-shaped cross sections in parallel with an X-Z plane and an X-Y plane.

The body 11 includes a multi-layer unit 16, side margins 17, and bonding units 18.

The multi-layer unit 16 has a configuration in which a plurality of flat plate-like ceramic layers extending along the X-Y plane is laminated in the Z-axis direction.

The side margins 17 cover the entire areas of both the side surfaces of the multi-layer unit 16 that are oriented in the Y-axis direction. The bonding units 18 are each provided between the multi-layer unit 16 and each of the side margins 17. In other words, the side margins 17 are bonded to both the side surfaces of the multi-layer unit 16 via the bonding units 18.

The multi-layer unit 16 includes a capacitance forming unit 19 and covers 20.

The capacitance forming unit 19 includes a plurality of first internal electrodes 12 and a plurality of second internal electrodes 13. The first internal electrodes 12 and the second internal electrodes 13 are alternately disposed between the ceramic layers along the Z-axis direction. The first internal electrodes 12 are connected to the first external electrode 14 and are insulated from the second external electrode 15. The second internal electrodes 13 are connected to the second external electrode 15 and are insulated from the first external electrode 14.

The covers 20 cover the upper and lower surfaces of the capacitance forming unit 19 in the Z-axis direction. The covers 20 do not include the first internal electrodes 12 and the second internal electrodes 13.

In such a manner, in the body 11, except for both the end surfaces, which are oriented in the X-axis direction and to which the first external electrode 14 and the second external electrode 15 are provided, surfaces of the capacitance forming unit 19 are covered with the side margins 17 and the covers 20. The side margins 17 and the covers 20 have main functions of protecting the periphery of the capacitance forming unit 19 and ensuring insulation properties of the first internal electrodes 12 and the second internal electrodes 13.

The first internal electrodes 12 and the second internal electrodes 13 are each made of an electrical conductive material and function as internal electrodes of the multi-layer ceramic capacitor 10. Examples of the electrical conductive material include nickel (Ni), copper (Cu), palladium (Pd), platinum (Pt), silver (Ag), gold (Au), and a metal material including an alloy of them.

The capacitance forming unit 19 is made of dielectric ceramics. In the capacitance forming unit 19, in order to increase capacitances of the ceramic layers provided between the first internal electrodes 12 and the second internal electrodes 13, a material having a high dielectric constant is used as a material configuring the ceramic layers. Examples of the material configuring the ceramic layers of the capacitance forming unit 19 include polycrystals of a barium titanate ($BaTiO_3$) based material, i.e., polycrystals having a Perovskite structure containing barium (Ba) and titanium (Ti).

The side margins 17 and the covers 20 are also made of dielectric ceramics. The material of the side margins 17 and the covers 20 may be insulating ceramics, but use of dielectric ceramics similar to the dielectric ceramics of the ceramic layers of the capacitance forming unit 19 leads to suppression of internal stress in the body 11.

With the configuration described above, when a voltage is applied between the first external electrode 14 and the second external electrode 15 in the multi-layer ceramic capacitor 10, a voltage is applied to the plurality of ceramic layers between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the multi-layer ceramic capacitor 10 according to this embodiment only needs to include the side margins 17 and the bonding units 18, and other configurations can be changed as appropriate. For example, the number of first internal electrodes 12 and second internal electrodes 13 can be determined as appropriate in accordance with the size and performance expected for the multi-layer ceramic capacitor 10.

Further, in FIGS. 2 and 3, in order to make the facing state of the first and second internal electrodes 12 and 13 easily viewable, the number of first internal electrodes 12 and the number of second internal electrodes 13 are each set to four. However, actually, more first and second internal electrodes 12 and 13 are provided so as to ensure the capacitance of the multi-layer ceramic capacitor 10.

2. Configuration of Bonding Unit 18

As described above, in the multi-layer ceramic capacitor 10 according to this embodiment, the side margins 17 are bonded to the multi-layer unit 16 via the bonding units 18.

The bonding unit 18 has higher silicon (Si) content than the multi-layer unit 16 and the side margins 17. Typically, the bonding unit 18 includes polycrystals of dielectric ceramics and glass phases G containing silicon as a main component. The polycrystals of dielectric ceramics have a composition similar to the multi-layer unit 16 and the side margins 17.

It should be noted that the bonding unit 18 may contain components other than the dielectric ceramics and the glass phases G as needed. Further, the multi-layer unit 16 and the side margins 17 may contain a smaller amount of silicon than the bonding units 18.

Figure 4:
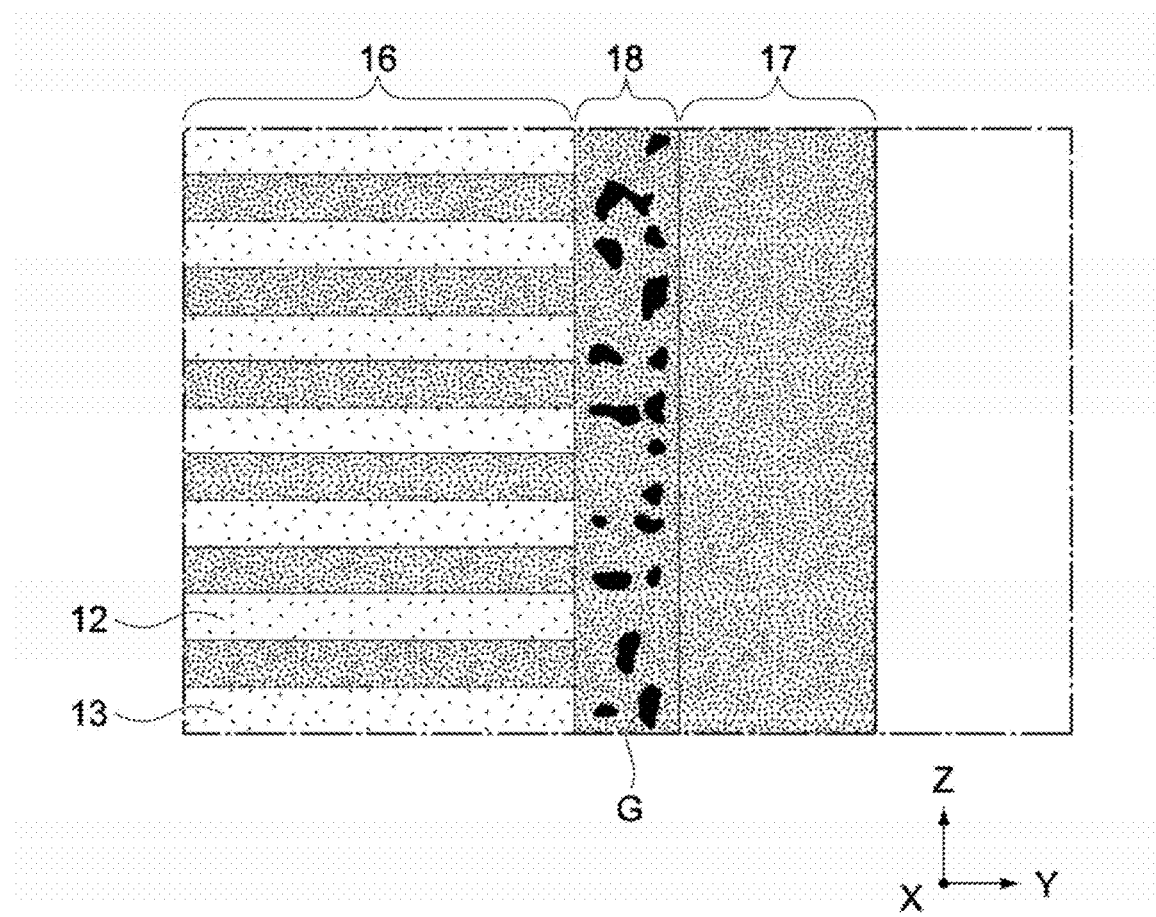
FIG. 4 is a schematic view of a microstructure of the multi-layer ceramic capacitor in an area P shown in FIG. 3.

FIG. 4 is a schematic view of a microstructure of the multi-layer ceramic capacitor 10 in an area P surrounded by a chain line of FIG. 3. A microstructure of a cross section of the multi-layer ceramic capacitor 10 can be observed with a scanning electron microscope (SEM), for example.

The capacitance forming unit 19 of the multi-layer unit 16 has a structure in which the first internal electrodes 12 and the second internal electrodes 13 are laminated in the Z-axis direction via the ceramic layers made of substantially-uniform polycrystals of dielectric ceramics.

The side margins 17 each have a structure of substantially-uniform polycrystals of dielectric ceramics.

The bonding units 18 each have a structure in which the glass phases G are unevenly distributed in grain boundaries of the polycrystals of dielectric ceramics.

It should be noted that actually, interfaces between the ceramic layers of the multi-layer unit 16 and the bonding units 18 or interfaces between the side margins 17 and the bonding units 18 are difficult to observe in some cases.

Typically, the glass phases G of the bonding unit 18 are unevenly distributed in a granular form as shown in FIG. 4. The glass phases G of the bonding unit 18 can have any size.

For example, the bonding unit 18 may be observed as having a substantially-uniform microstructure because the glass phases G may be too small to observe. Also in this case, when the silicon content of the bonding unit 18 is higher than the silicon content of the multi-layer unit 16 and the side margins 17, the presence of the glass phases G in the bonding unit 18 can be presumed.

In the multi-layer ceramic capacitor 10 according to this embodiment, high bonding properties of the side margins 17 to the multi-layer unit 16 can be obtained owing to an operation of the bonding units 18 at sintering. The operation of the bonding units 18 will be described in detail in the section of "Method of Producing Multi-layer Ceramic Capacitor 10" described later.

In order to successfully obtain the above-mentioned operation of the bonding units 18, the thickness of the bonding unit 18 is desirably 0.5 µm or more. Further, in order to successfully maintain the form and performance of the multi-layer ceramic capacitor 10, the thickness of the bonding unit 18 is desirably 5 µm or less.

Additionally, in order to successfully obtain the above-mentioned operation of the bonding units 18, the glass phase G of the bonding unit 18 desirably contains, in addition to silicon as a main component, accessory components such as barium (Ba), manganese (Mn), magnesium (Mg), boron (B), vanadium (V), holmium (Ho), aluminum (Al), calcium (Ca), zinc (Zn), potassium (K), tin (Sn), and zirconium (Zr).

3. Method of Producing Multi-Layer Ceramic Capacitor 10

Figure 5:
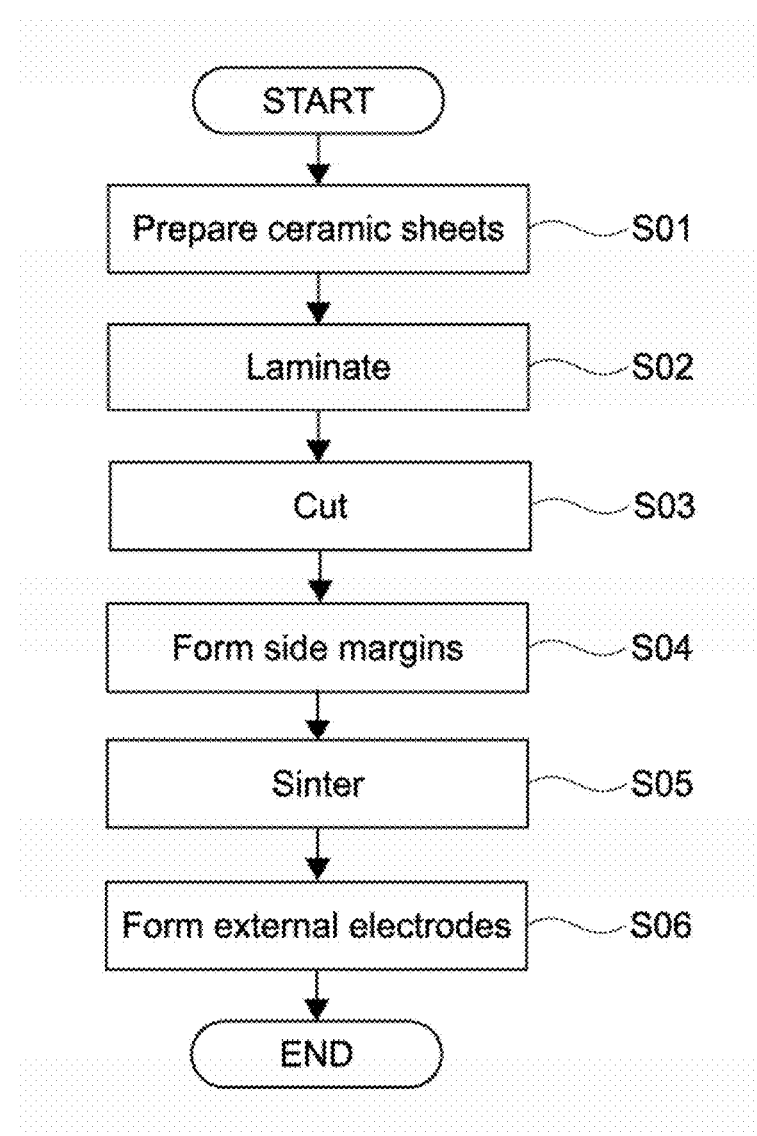
FIG. 5 is a flowchart showing a method of producing the multi-layer ceramic capacitor.

FIG. 5 is a flowchart showing a method of producing the multi-layer ceramic capacitor 10. FIGS. 6A to 10 are views each showing a production process of the multi-layer ceramic capacitor 10. Hereinafter, the method of producing the multi-layer ceramic capacitor 10 will be described along FIG. 5 with reference to FIGS. 6A to 10 as appropriate.

3.1 Step S01: Preparation of Ceramic Sheets

In Step S01, first ceramic sheets 101 and second ceramic sheets 102 for forming the capacitance forming unit 19, and third ceramic sheets 103 for forming the covers 20 are prepared. The first, second, and third ceramic sheets 101, 102, and 103 are configured as unsintered dielectric green sheets and formed into sheets by using a roll coater or a doctor blade, for example.

FIGS. 6A, 6B, and 6C are plan views of the first, second, and third ceramic sheets 101, 102, and 103, respectively. At this stage, the first, second, and third ceramic sheets 101, 102, and 103 are not yet cut into the multi-layer ceramic capacitors 10. FIGS. 6A, 6B, and 6C each show cutting lines Lx and Ly used when the sheets are cut into the multi-layer ceramic capacitors 10. The cutting lines Lx are parallel to the X axis, and the cutting lines Ly are parallel to the Y axis.

As shown in FIGS. 6A, 6B, and 6C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheet 103 corresponding to the cover 20.

The first and second internal electrodes 112 and 113 can be formed using any electrical conductive paste. For formation of the first and second internal electrodes 112 and 113 by use of an electrical conductive paste, a screen printing method or a gravure printing method can be used, for example.

Each of the first and second internal electrodes 112 and 113 is disposed over two areas and extends like a belt in the Y-axis direction. The two areas are adjacent to each other in the X-axis direction and divided by the cutting line Ly. The first internal electrodes 112 are shifted from the second internal electrodes 113 in the X-axis direction by one row including the areas divided by the cutting lines Ly. In other words, the cutting line Ly passing through the center of the first internal electrode 112 passes through an area between the second internal electrodes 113, and the cutting line Ly passing through the center of the second internal electrode 113 passes through an area between the first internal electrodes 112.

3.2 Step S02: Lamination

In Step S02, the first, second, and third ceramic sheets 101, 102, and 103 prepared in Step S01 are laminated, to produce a multi-layer sheet 104.

Figure 7:
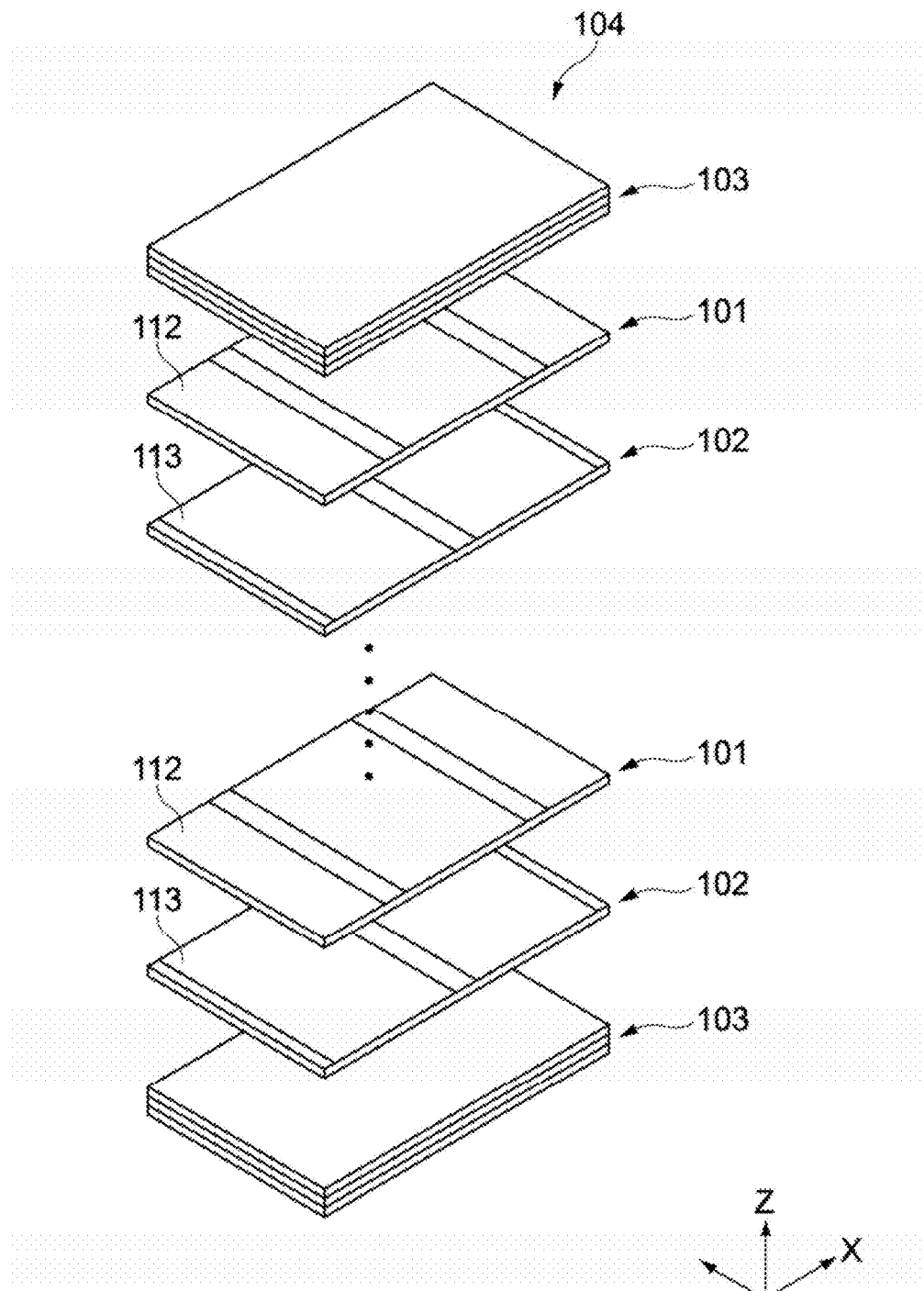
FIG. 7 is a perspective view showing the production process of the multi-layer ceramic capacitor.

FIG. 7 is a perspective view of the multi-layer sheet 104 obtained in Step S02. For the purpose of description, FIG. 7 shows the first, second, and third ceramic sheets 101, 102, and 103 in an exploded manner. In an actual multi-layer sheet 104, however, the first, second, and third ceramic sheets 101, 102, and 103 are pressure-bonded by hydrostatic pressing, uniaxial pressing, or the like for integration. With this configuration, a high-density multi-layer sheet 104 is obtained.

In the multi-layer sheet 104, the first ceramic sheets 101 and the second ceramic sheets 102 that correspond to the capacitance forming unit 19 are alternately laminated in the Z-axis direction.

Further, in the multi-layer sheet 104, the third ceramic sheets 103 corresponding to the covers 20 are laminated on the uppermost and lowermost surfaces of the first and second ceramic sheets 101 and 102 alternately laminated in the Z-axis direction. It should be noted that in the example shown in FIG. 7, three third ceramic sheets 103 are laminated on each of the uppermost and lowermost surfaces of the laminated first and second ceramic sheets 101 and 102, but the number of third ceramic sheets 103 can be changed as appropriate.

3.3 Step S03: Cutting

In Step S03, the multi-layer sheet 104 obtained in Step S02 is cut with a rotary blade, a push-cutting blade, or the like, to produce unsintered multi-layer chips 116.

Figure 8:
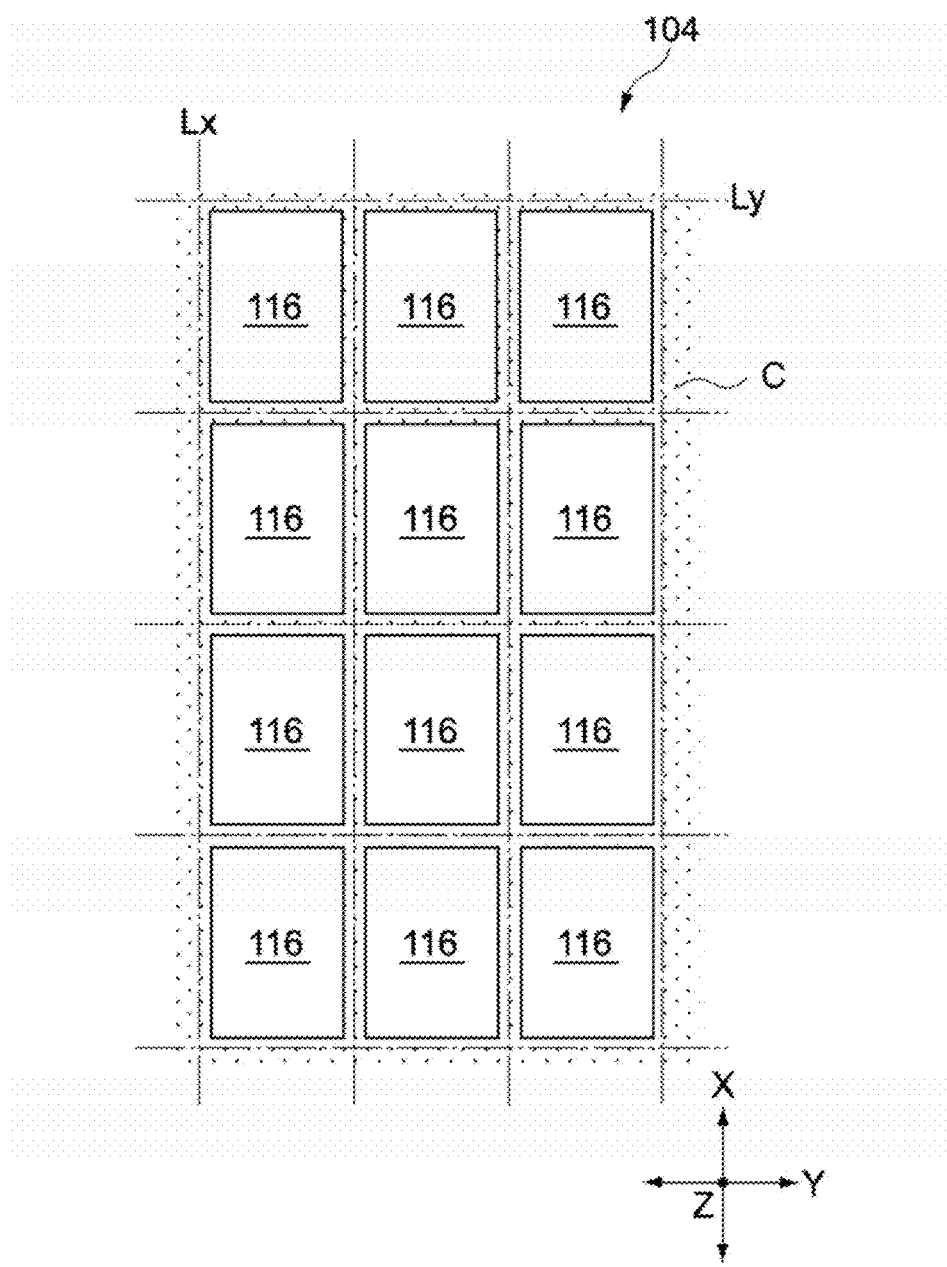
FIG. 8 is a perspective view showing the production process of the multi-layer ceramic capacitor.

FIG. 8 is a plan view of the multi-layer sheet 104 after Step S03. The multi-layer sheet 104 is cut along the cutting lines Lx and Ly while being fixed to a holding member C. With this configuration, the multi-layer sheet 104 is singulated, so that the multi-layer chips 116 are obtained. At that time, the holding member C is not cut, and thus the multi-layer chips 116 are connected via the holding member C.

Figure 9:
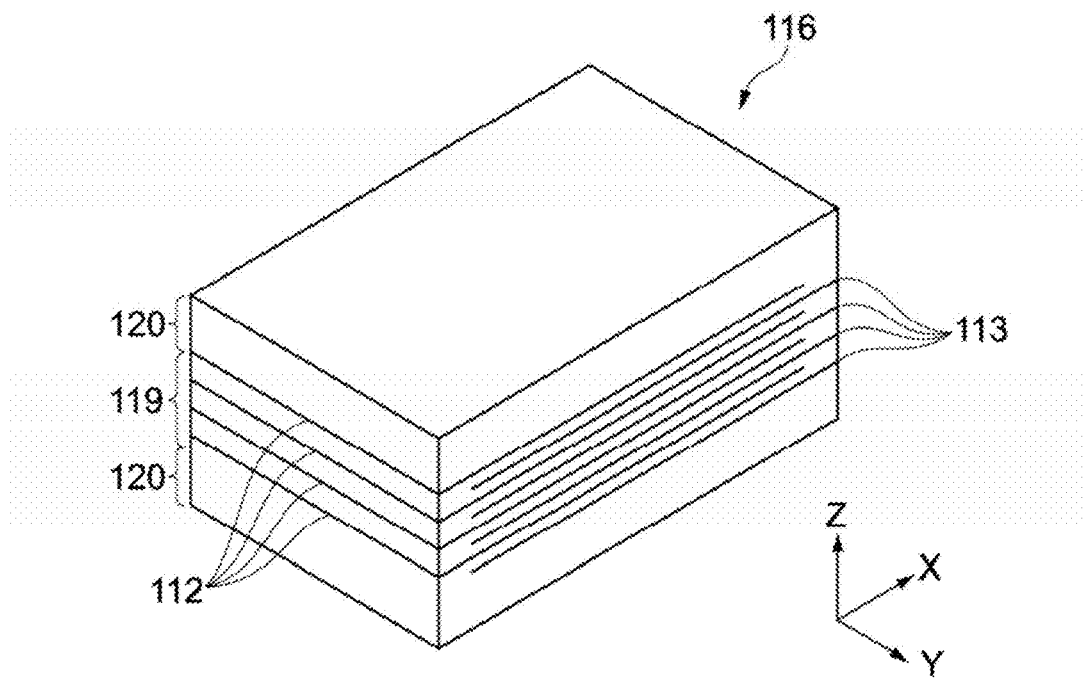
FIG. 9 is a perspective view showing the production process of the multi-layer ceramic capacitor.

FIG. 9 is a perspective view of the multi-layer chip 116 obtained in Step S03. The multi-layer chip 116 includes a capacitance forming unit 119 and covers 120 that are unsintered. In the multi-layer chip 116, the unsintered first and second internal electrodes 112 and 113 are exposed to the cut surfaces, i.e., both the side surfaces oriented in the Y-axis direction.

3.4 Step S04: Formation of Side Margins

In Step S04, unsintered side margins 117 and bonding units 118 are provided to the multi-layer chip 116 obtained in Step S03, to produce an unsintered body 111.

In Step S04, in order to provide the side margins 117 and the bonding units 118 to both the side surfaces of the multi-layer chip 116, the orientation of the multi-layer chip 116 is changed as appropriate by replacement of a holding member such as a tape, for example.

In particular, in Step S04, the side margins 117 and the bonding units 118 are provided to both the side surfaces of the multi-layer chip 116 that are oriented in the Y-axis direction, both the side surfaces being the cut surfaces of the multi-layer chip 116 in Step S03. As a result, in Step S04, it is desirable to previously detach the multi-layer chips 116 from the holding member C and rotate the multi-layer chips 116 by 90 degrees.

Figure 10:
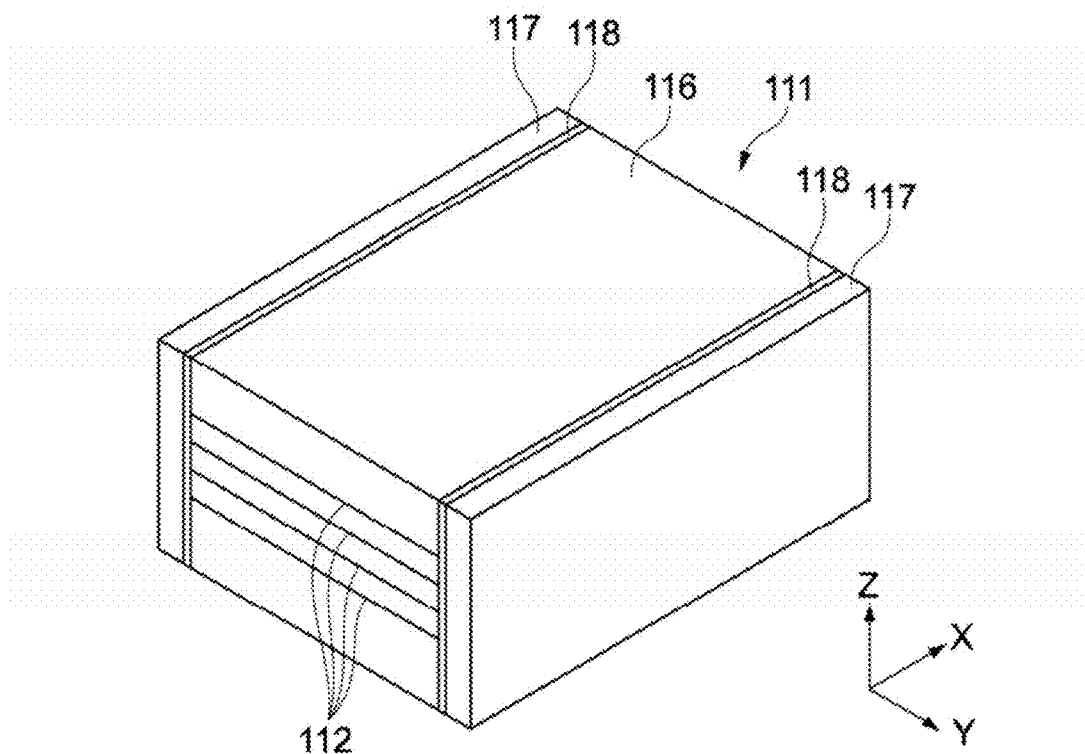
FIG. 10 is a perspective view showing the production process of the multi-layer ceramic capacitor.

FIG. 10 is a perspective view of the unsintered body 111 obtained in Step S04.

The side margins 117 are prepared as sheets having a composition similar to the first, second, and third ceramic sheets 101, 102, and 103 and having a predetermined thickness. The composition of the first, second, and third ceramic sheets 101, 102, and 103 is determined as a charging composition of predetermined dielectric ceramics.

The bonding units 118 are prepared as sheets having a predetermined thickness and a composition in which a silicon component (e.g., silicon dioxide) is added to the composition of the first, second, and third ceramic sheets 101, 102, and 103.

The side margins 117 are attached to the side surfaces of the multi-layer chip 116 via the bonding units 118.

In Step S04, for example, after the bonding units 118 are attached to the side surfaces of the multi-layer chip 116, the side margins 117 can be attached to the bonding units 118. Alternatively, for example, the side margins 117 and the bonding units 118 may be attached to each other on a polyethylene terephthalate (PET) film and then integrally attached to the side surfaces of the multi-layer chip 116.

Alternatively, in Step S04, the side margins 117 and the bonding units 118 may not be formed into sheets, but be formed by application or dipping to coat the side surfaces of the multi-layer chip 116. In other words, the side surfaces of the multi-layer chip 116 may be coated with the bonding units 118, and then the bonding units 118 may be coated with the side margins 117.

Alternatively, in Step S04, in combination with those above methods, the side surfaces of the multi-layer chip 116 may be coated with the bonding units 118, and then sheet-like side margins 117 may be attached to the bonding units 118, for example. Alternatively, sheet-like bonding units 118 may be attached to the side surfaces of the multi-layer chip 116 and then coated with the side margins 117.

The side surfaces of the multi-layer chip 116, on which the side margins 117 and the bonding units 118 are provided, receive a pressing force from the side margins 117 and the bonding units 118. Thus, peel-off of the ceramic layers easily occurs. As a result, in Step S04, it is desirable to not perform processing for achieving high density, such as hydrostatic pressing and uniaxial pressing, on the unsintered body 111.

3.5 Step S05: Sintering

In Step S05, the unsintered body 111 obtained in Step S04 is sintered to produce the body 11 of the multi-layer ceramic capacitor 10 shown in FIGS. 1 to 3. In other words, in Step S05, the multi-layer chip 116 becomes the multi-layer unit 16, the side margins 117 become the side margins 17, and the bonding units 118 become the bonding units 18.

A sintering temperature for the body 111 in Step S05 can be determined on the basis of a sintering temperature for the multi-layer chip 116 and the side margins 117. For example, when a barium titanate based material is used as the dielectric ceramics, the sintering temperature for the body 111 can be set to approximately 1,000 to 1,300° C. Further, sintering can be performed in a reduction atmosphere or a low-oxygen partial pressure atmosphere, for example.

Here, it is assumed that the shrinkage behaviors of the multi-layer chip 116 and the side margins 117 at the sintering are perfectly matched with each other. In this case, if the side margins 117 are directly provided to the multi-layer chip 116 without providing the bonding units 118, there is a high possibility that high bonding properties of the side margins 117 to the multi-layer chip 116 is obtained.

In this regard, both of the multi-layer chip 116 and the side margins 117 are made of similar dielectric ceramics such that the shrinkage behaviors thereof at the sintering do not largely differ.

However, in general, it is difficult to perfectly match the shrinkage behaviors at the sintering of the multi-layer chip 116 and the side margins 117. In other words, the multi-layer chip 116 and the side margins 117 inevitably have a slight difference in timing of shrinkage or in amount of shrinkage at the sintering.

A main cause of a difference in shrinkage behavior at the sintering between the multi-layer chip 116 and the side margins 117 is a difference in density between the multi-layer chip 116 and the side margins 117.

In other words, as described above, the multi-layer chip 116 achieves high density in the lamination step of Step S02, whereas the body 111 including the side margins 117 and the bonding units 118 do not achieve high density in Step S04. As a result, the side margins 117 have a lower density than the multi-layer chip 116.

With this configuration, the multi-layer chip 116 and the side margins 117 have a difference in rate of temperature increase and also a difference in timing of shrinkage. Further, since the side margins 117 include more pores than the multi-layer chip 116, the multi-layer chip 116 and the side margins 117 have a difference in amount of shrinkage.

Further, another cause of a difference in shrinkage behavior at the sintering between the multi-layer chip 116 and the side margins 117 is the presence or absence of the first and second internal electrodes 112 and 113.

In other words, the multi-layer chip 116 includes the first and second internal electrodes 112 and 113, whereas the side margins 117 include no internal electrodes. In the multi-layer chip 116, the dielectric ceramics and the first and second internal electrodes 112 and 113 are sintered at the same time, and thus the multi-layer chip 116 has a shrinkage behavior different from the shrinkage behavior of the side margins 117 made of dielectric ceramics only.

In addition, still another cause of a difference in shrinkage behavior at the sintering between the multi-layer chip 116 and the side margins 117 is a difference in composition.

In other words, for example, in order to increase a mechanical strength, the side margins 117 may have a composition different from a composition of the multi-layer chip 116. More specifically, to the side margins 117, an element that is not contained in the multi-layer chip 116 may be added or a composition ratio that is different from a composition ratio of the multi-layer chip 116 may be provided. In such a case, the multi-layer chip 116 and the side margins 117 have a difference in sintering temperature for the dielectric ceramics, and thus have a difference in shrinkage behavior at the sintering.

In this embodiment, in order to reduce the difference in shrinkage behavior at the sintering, which is caused between the multi-layer chip 116 and the side margins 117 as described above, the bonding units 118 are provided between the multi-layer chip 116 and the side margins 117.

As described above, in the bonding units 118, a silicon component is added to the charging composition of the dielectric ceramics. Thus, in the bonding units 118 at the sintering, the dielectric ceramics is sintered similarly to the multi-layer chip 116 and the side margins 117.

Meanwhile, in the bonding units 118 at the sintering, molten phases containing silicon are generated by the operation of the silicon component. In the bonding units 118, the molten phases are discharged to grain boundaries and pores of the polycrystals of the dielectric ceramics. Typically, the molten phases discharged to grain boundaries and pores of the polycrystals of the dielectric ceramics are mutually aggregated, and thus granules are formed.

When a melting point of the silicon component in the bonding units 118 is higher than the sintering temperature, the molten phases are generated while peripheral accessory components are incorporated therein such that the melting point of the silicon component is made lower than the sintering temperature. For example, when silicon dioxide having a melting point of approximately 1,650° C. is used as a silicon component, accessory components are incorporated such that the silicon component has a melting point lower than 1,300° C.

The accessory components incorporated in the molten phases may be previously contained in the bonding units 118 or may be supplied from the multi-layer chip 116 or the side margins 117 by diffusion.

Examples of the accessory components incorporated in the molten phases include barium, manganese, magnesium, boron, vanadium, holmium, aluminum, calcium, zinc, potassium, tin, and zirconium. In particular, when a barium titanate based material is used as the dielectric ceramics, barium contained in abundance in the dielectric ceramics can be used as the accessory component.

It should be noted that when the silicon component previously contains the accessory components described above and the melting point is thus sufficiently low, it is unnecessary to supply further accessory components to the silicon component.

Due to the presence of the molten phases in the grain boundaries and pores of the polycrystals of the dielectric ceramics, the bonding units 118 at the sintering are flexibly deformable.

Thus, the bonding units 118 are freely deformable in accordance with the shrinkage behaviors of the multi-layer chip 116 and the side margins 117. As a result, even when the multi-layer chip 116 and the side margins 117 have a difference in level of shrinkage at the sintering, the multi-layer chip 116 and the side margins 117 do not apply stress mutually. Thus, cracks and peel-off can be inhibited from occurring between the multi-layer unit 16 and the side margins 17.

In such a manner, sintering is completed while the multi-layer chip 116 and the side margins 117 mutually maintain good connection through the bonding units 118. With this configuration, high bonding properties of the side margins 17 to the multi-layer unit 16 are obtained in the sintered body 11.

Further, at the sintering, the pores of the bonding units 118 are filled with the molten phases. Thus, the sintered bonding units 118 have a structure including a small amount of pores. With this configuration, the multi-layer ceramic capacitor 10 obtains high moisture resistance.

In the sintered body 11, the molten phases generated in the bonding units 118 at the sintering are solidified and then changed to the glass phases G shown in FIG. 4.

The size of each glass phase G changes in accordance with the progress level of aggregation of the molten phases in the bonding units 118 at the sintering. In other words, as the aggregation of the molten phases progresses more, the glass phases G grow more. When the aggregation of the molten phases does not progress, the glass phases G remain small. In particular, when the aggregation of the molten phases hardly progresses, the glass phases G may be too small to observe in a microstructure observation, and the bonding units 18 may be observed as having substantially uniform microstructures.

In order to sufficiently obtain the above-mentioned operation of the bonding unit 118 at the sintering, the thickness of the sintered bonding unit 118 is desirably set to 0.5 µm or more.

Meanwhile, in the bonding units 118 having high silicon content, because of a large difference in rate of shrinkage at the sintering from the multi-layer chip 116 and the side margins 117, it is desirable that the shrinkage behavior of the bonding units 118 at the sintering have no influence on the form of the body 11. Further, when the bonding units 118 having high silicon content are thick, diffusion of silicon to the multi-layer chip 116 easily occurs, and this reduces a capacitance in each layer of the multi-layer chip 116.

From the above viewpoints, it is desirable that the thickness of the bonding unit 118 be sufficiently thin. Specifically, it is desirable to set the thickness of the sintered bonding unit 118 to be 5 µm or less.

3.6 Step S06: Formation of External Electrodes

In Step S06, the first external electrode 14 and the second external electrode 15 are formed on the body 11 obtained in Step S05, to produce the multi-layer ceramic capacitor 10 shown in FIGS. 1 to 3.

In Step S06, first, an unsintered electrode material is applied so as to cover one of both the end surfaces of the body 11 and then applied to the other one of both the end surfaces of the body 11, both the end surfaces being oriented in the X-axis direction. The applied unsintered electrode materials are subjected to baking in a reduction atmosphere or a low-oxygen partial pressure atmosphere, for example, to form base films on the body 11. On the base films baked onto the body 11, intermediate films and surface films are formed by plating such as electrolytic plating. Thus, the first external electrode 14 and the second external electrode 15 are completed.

It should be noted that part of the processing in Step S06 described above may be performed before Step S05. For example, before Step S05, the unsintered electrode material may be applied to both the end surfaces of the unsintered body 111 that are oriented in the X-axis direction, and in Step S05, the unsintered body 111 may be sintered and, simultaneously, the unsintered electrode material may be baked to form base films of the first external electrode 14 and the second external electrode 15.

4. Other Embodiments

While the embodiment of the present invention has been described, the present invention is not limited to the embodiment described above, and it should be appreciated that the present invention may be variously modified.

For example, in the multi-layer ceramic capacitor 10, the capacitance forming unit 19 may be divided into capacitance forming units in the Z-axis direction. In this case, in each capacitance forming unit 19, the first internal electrodes 12 and the second internal electrodes 13 only need to be alternately disposed along the Z-axis direction. In a portion where the capacitance forming units 19 are next to each other, the first internal electrodes 12 or the second internal electrodes 13 may be continuously disposed.

What is claimed is:

1. A multi-layer ceramic capacitor, comprising:
    a multi-layer unit that includes
        ceramic layers laminated in a first direction, and
        internal electrodes disposed between the ceramic layers;
    side margins that cover side surfaces of the multi-layer unit from a second direction orthogonal to the first direction; and
    bonding units that are each disposed between the multi-layer unit and each of the side margins and have more pores filled with glass phases than the ceramic layers and the side margins,
    wherein the bonding units cover entire areas of the side surfaces of the multi-layer unit covered by the side margins.

2. The multi-layer ceramic capacitor according to claim 1, wherein
    each of the bonding units has a thickness of 0.5 µm or more and 5 µm or less.

3. The multi-layer ceramic capacitor according to claim 1, wherein
    the glass phases contain silicon.

4. The multi-layer ceramic capacitor according to claim 3, wherein
    the glass phases contain at least one of barium, manganese, magnesium, boron, vanadium, holmium, aluminum, calcium, zinc, potassium, tin, and zirconium.

5. The multi-layer ceramic capacitor according to claim 4, wherein
    the ceramic layers are polycrystals having a Perovskite structure containing barium and titanium, and
    the glass phases contain barium.

* * * * *